United States Patent
Kanda et al.

(10) Patent No.: US 9,746,062 B2
(45) Date of Patent: Aug. 29, 2017

(54) POWER TRANSMISSION DEVICE FOR VEHICLE

(71) Applicants: Hitachi Construction Machinery Co., Ltd., Bunkyo-ku, Tokyo (JP); KABUSHIKI KAISHA KCM, Kako-gun, Hyogo (JP)

(72) Inventors: Shuuji Kanda, Hitachinaka (JP); Junichi Shirane, Akashi (JP); Hiroki Fujita, Kobe (JP)

(73) Assignees: Hitachi Construction Machinery Co., Ltd., Tokyo (JP); Kabushiki Kaisha KCM, Hyogo (JP)

( * ) Notice: Subject to any disclaimer, the term of this patent is extended or adjusted under 35 U.S.C. 154(b) by 90 days.

(21) Appl. No.: 14/812,049

(22) Filed: Jul. 29, 2015

(65) Prior Publication Data

US 2016/0033023 A1 Feb. 4, 2016

(30) Foreign Application Priority Data

Jul. 30, 2014 (JP) ................... 2014-154856

(51) Int. Cl.
*F16H 45/02* (2006.01)
*F16H 47/06* (2006.01)
(Continued)

(52) U.S. Cl.
CPC .......... *F16H 45/02* (2013.01); *F16H 61/143* (2013.01); *F16H 2045/021* (2013.01);
(Continued)

(58) Field of Classification Search
CPC ........... F16H 61/142; F16H 2045/0205; F16H 2045/0215; F16H 45/02; F16H 2061/0046
See application file for complete search history.

(56) References Cited

U.S. PATENT DOCUMENTS 4,099,603 A 7/1978 Peppel
4,377,226 A * 3/1983 Chevalier ............. F16H 61/143
192/3.3
(Continued)

FOREIGN PATENT DOCUMENTS

JP 59-113366 A 6/1984
JP 60-84451 A 5/1985
(Continued)

OTHER PUBLICATIONS

Korean Office Action issued in counterpart Korean Application No. 10-2015-0107048 dated Aug. 8, 2016 (four pages).
(Continued)

*Primary Examiner* — Jacob S Scott
*Assistant Examiner* — Tinh Dang
(74) *Attorney, Agent, or Firm* — Crowell & Moring LLP

(57) ABSTRACT

A lockup device (63) includes a lockup clutch (64) for establishing connection between a rotating body (44) of a torque converter (41) and a transmission shaft (55), a lockup control valve (70) that controls supply/discharge of pressurized oil from a hydraulic pump (69) to/from the lockup clutch (64), and a lockup oil passage (75) that introduces pressurized oil from the lockup control valve (70) to the lockup clutch (64). The lockup control valve (70) is arranged on an outer side face (18B) of an intermediate casing (18) in a position of radially overlapping the transmission shaft (55) in a radial direction of the transmission shaft (55). Further, a casing side oil passage (76) constituting the lockup oil passage (75) is formed as a linear oil passage that linearly extends in the radial direction of the transmission shaft (55) between the lockup control valve (70) and the transmission shaft side oil passage (77).

3 Claims, 10 Drawing Sheets

(51) Int. Cl.
*F16H 61/00* (2006.01)
*F16H 61/14* (2006.01)
(52) U.S. Cl.
CPC ............... *F16H 2045/0205* (2013.01); *F16H 2045/0215* (2013.01); *F16H 2061/0046* (2013.01)

(56) References Cited

U.S. PATENT DOCUMENTS

| | | | |
|---|---|---|---|
| 6,810,772 B2 * | 11/2004 | Hori | F16H 47/06 |
| | | | 74/731.1 |
| 6,904,933 B2 | 6/2005 | Oyamada | |
| 8,960,395 B2 * | 2/2015 | Waters | F16H 45/02 |
| | | | 192/12 C |
| 9,279,489 B2 * | 3/2016 | Hoyle | F16H 3/093 |
| 2006/0207852 A1 * | 9/2006 | Adelmann | F16H 45/02 |
| | | | 192/3.29 |

FOREIGN PATENT DOCUMENTS

| | | |
|---|---|---|
| JP | 61-180069 A | 8/1986 |
| JP | 4-29662 A | 1/1992 |
| JP | 5-162548 A | 9/1993 |
| JP | 2003-60360 A | 2/2003 |
| JP | 2009-62942 A | 3/2009 |

OTHER PUBLICATIONS

European Search Report issued in counterpart European Application No. 15179151.4 dated Oct. 26, 2016 (eight pages).
Japanese Office Action issued in counterpart Japanese Application No. 2014-154856 dated May 16, 2017 (three pages).

* cited by examiner

POWER TRANSMISSION DEVICE FOR VEHICLE

TECHNICAL FIELD

The present invention relates to a power transmission device for vehicles that is mounted on a working vehicle such as a wheel loader or a wheel type excavator to transmit the rotation of an engine to an output shaft for travelling.

BACKGROUND ART

In general, a wheel type working vehicle representative examples of which are wheel loaders, wheel type excavators and the like rotates wheels to travel on general roads toward a working site. In this case, there are wheel type working vehicles that drive a hydraulic motor by an engine (prime mover) and transmit the rotation of the hydraulic motor to wheels or are equipped with a power transmission device for vehicles that transmits the rotation of an engine through a torque converter and a transmission to wheels.

Here, the aforementioned power transmission device for vehicles includes a casing that is mounted on a vehicle, a transmission that is provided in the casing to change rotational speeds of the engine, a torque converter that is mounted in the casing to transmit the rotation of the engine through fluid to the transmission, and a lockup device that is mounted in the torque converter to transmit the rotation of the engine directly to the transmission.

The torque converter is configured of a rotating body that is rotatably supported in the casing and is rotated by the engine, and a hollow cylindrical transmission shaft that is rotatably supported in the casing to transmit the rotation of the rotating body through fluid or the lockup device to the transmission.

On the other hand, the lockup device is configured of a lockup clutch that establishes connection between the rotating body and the transmission shaft by pressurized oil delivered from a hydraulic pump, a lockup control valve that controls supply/discharge of the pressurized oil to/from the lockup clutch, and a lockup oil passage that introduces the pressurized oil from the lockup control valve to the lockup clutch (Patent Document 1).

PRIOR ART DOCUMENT

Patent Document

Patent Document 1: Japanese Patent Laid-Open No. Sho60-84451 A

SUMMARY OF THE INVENTION

However, since the lockup device in the power transmission device disclosed in Patent Document 1 is configured such that an oil passage in which pressurized oil for lockup flows is formed of a combination of a plurality of axial holes and a plurality of radial holes, the entire oil passage is bent in a complicating manner. As a result, there occurs a problem that pressure losses become large when the pressurized oil for lockup flows in the oil passage, leading to a reduction in responsiveness of a clutch for lockup.

Further, the lockup device in the power transmission device disclosed in Patent Document 1 is configured such that a control valve is mounted on an outer side face of a casing that accommodates a transmission therein. Therefore, there occurs a problem that a projecting amount of the control valve from the outer side face of the casing becomes large, thus leading to a large-sized power transmission device as a whole.

The present invention is made in view of the aforementioned problems in the conventional art, and an object of the present invention is to provide a power transmission device for vehicles that can suppress pressure losses when pressurized oil delivered from a hydraulic pump flows in a lockup oil passage and can miniaturize the power transmission device as a whole.

For solving the aforementioned problems, the present invention is applied to a power transmission device for vehicles comprising: a casing that is mounted on a vehicle; a transmission that is provided in the casing to change rotational speeds of an engine; a torque converter that is mounted in the casing to transmit the rotation of the engine through fluid to the transmission; and a lockup device that is mounted in the torque converter to transmit the rotation of the engine directly to the transmission, wherein the torque converter includes a rotating body that is rotatably supported in the casing and is rotated by the engine, and a hollow cylindrical transmission shaft that is rotatably supported in the casing to transmit the rotation of the rotating body through fluid or the lockup device to the transmission, and the lockup device includes a lockup clutch for establishing connection between the rotating body and the transmission shaft by pressurized oil delivered from a hydraulic pump, a lockup control valve that controls supply/discharge of the pressurized oil to/from the lockup clutch, and a lockup oil passage that introduces the pressurized oil from the lockup control valve to the lockup clutch.

The present invention is characterized in that the lockup control valve is positioned on an outer side face of the casing and is arranged in a position of overlapping the transmission shaft in a radial direction of the transmission shaft; the lockup oil passage includes a casing side oil passage that is provided in the casing to be connected to the lockup control valve, a transmission shaft side oil passage that is provided in the transmission shaft and an inlet side of which is connected to the casing side oil passage, and a rotating body side oil passage that is provided in the rotating body for establishing connection between an outlet side of the transmission shaft side oil passage and the lockup clutch; and the casing side oil passage is formed as a linear oil passage that linearly extends in the radial direction of the transmission shaft between the lockup control valve and the transmission shaft side oil passage.

According to this configuration, the casing side oil passage constituting the lockup oil passage linearly connects the lockup control valve and the transmission shaft side oil passage. Therefore, it is possible to reduce pressure losses to be generated when the pressurized oil delivered from the hydraulic pump flows from the lockup control valve through the casing side oil passage to the transmission shaft side oil passage. As a result, since the pressurized oil from the hydraulic pump can smoothly flow through the lockup oil passage to the lockup clutch, the responsiveness (clutch efficiency) of the lockup clutch can be increased to enhance reliability of the lockup device.

BRIEF DESCRIPTION OF THE DRAWINGS

FIG. 3 is an exploded perspective view illustrating the power transmission device for vehicles, a lockup control valve and the like.

MODE FOR CARRYING OUT THE INVENTION

Figure 1:
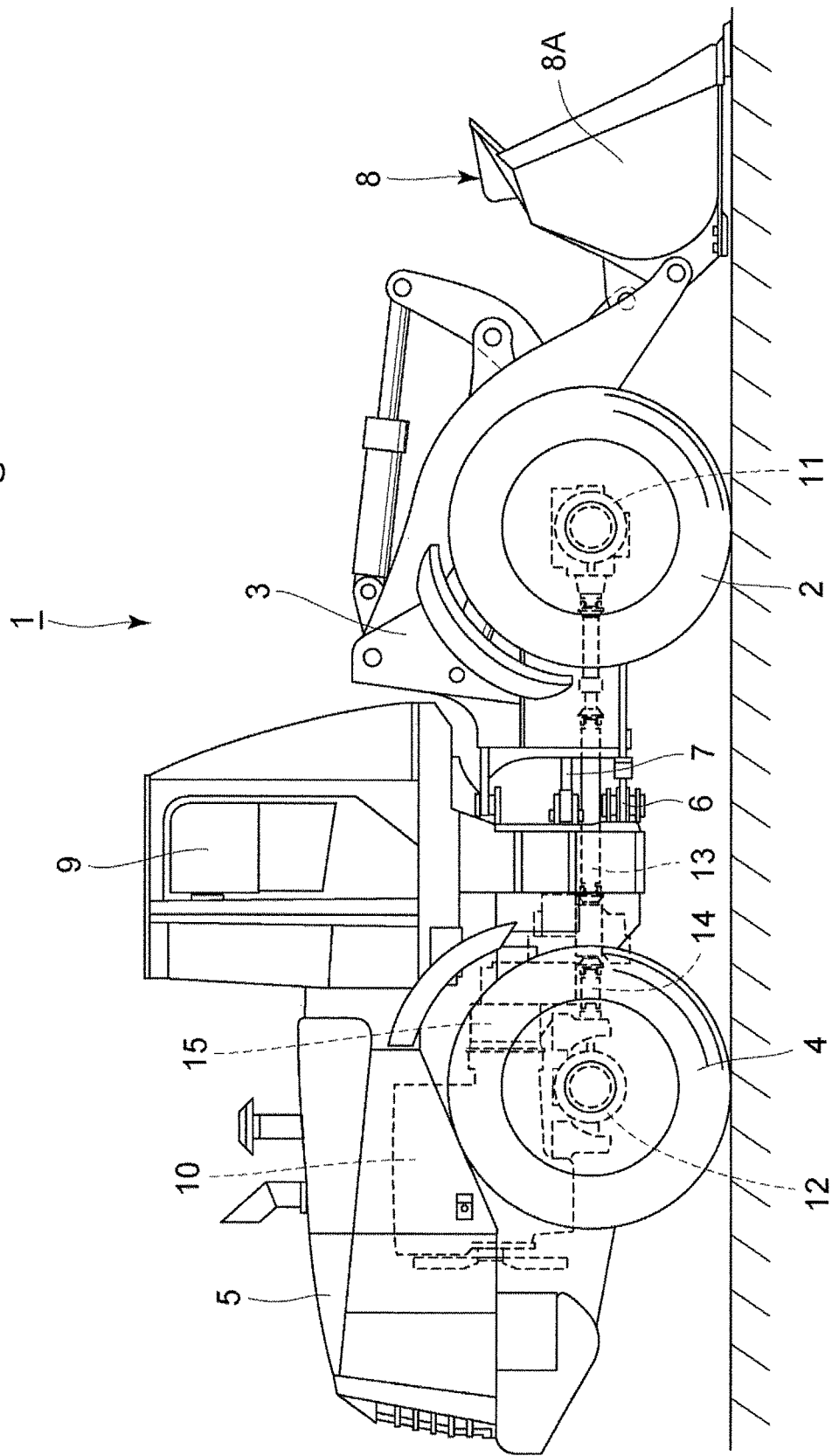
FIG. 1 is a front view illustrating a wheel loader on which a power transmission device for vehicles according to a first embodiment of the present invention is mounted.
Figure 2:
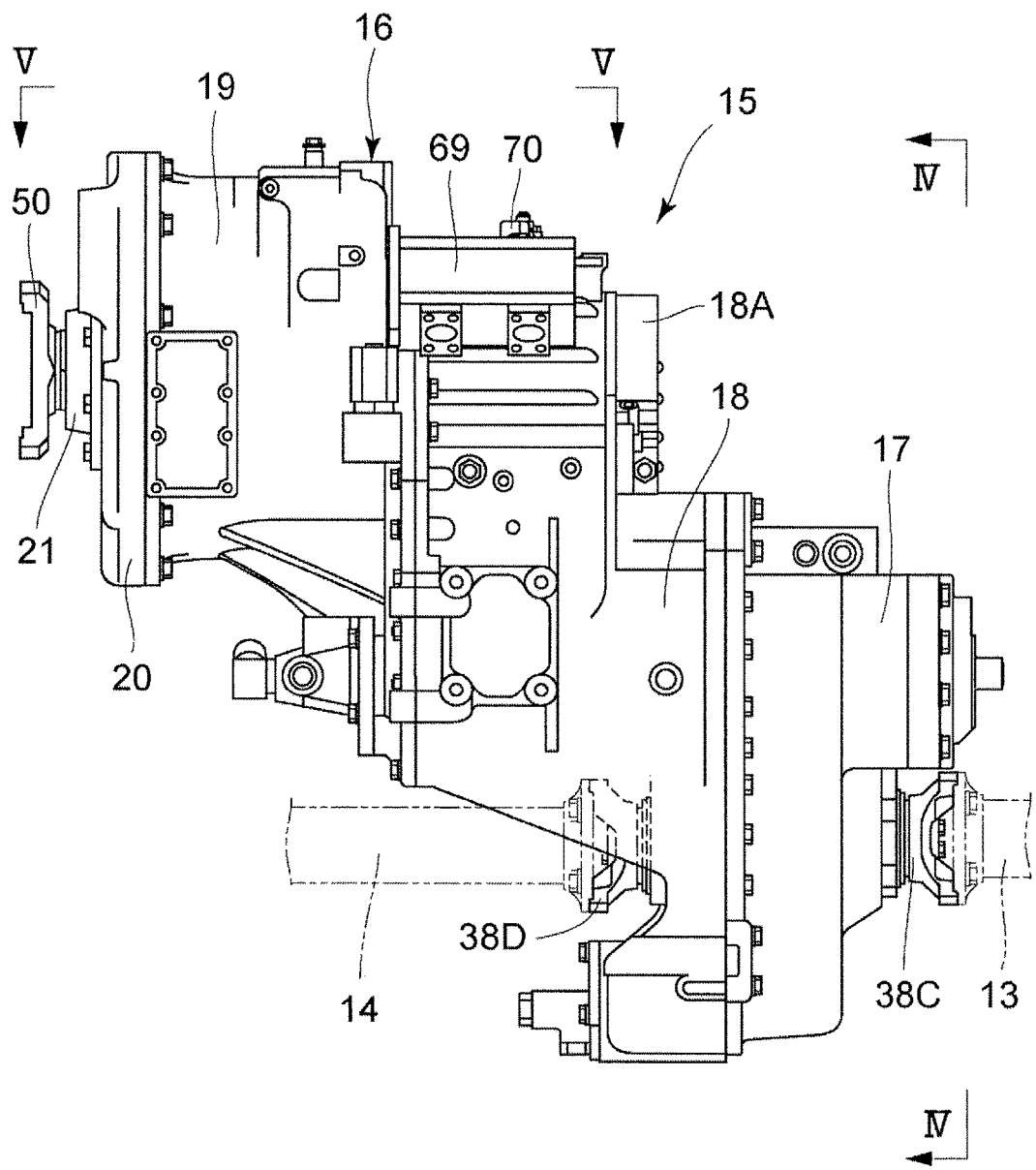
FIG. 2 is a front view illustrating the power transmission device for vehicles as a single body.

Hereinafter, power transmission devices for vehicles according to embodiments in the present invention will be in detail explained with reference to the accompanying drawings.

FIG. 1 to FIG. 9 illustrate a power transmission device for vehicles according to a first embodiment of the present invention.

In the figure, a wheel loader 1 is a representative example of a wheel type working vehicle. In the wheel loader 1, a front vehicle body 3 provided with left and right front wheels 2 is connected through a connecting mechanism 6 to a rear vehicle body 5 provided with left and right rear wheels 4 to be capable of bending in a left-right direction. Accordingly, the wheel loader 1 is configured as an accumulating type working vehicle. A steering cylinder 7 is provided between the front vehicle body 3 and the rear vehicle body 5, and expansion/contraction of the steering cylinder 7 enables the front vehicle body 3 and the rear vehicle body 5 to bend in the left-right direction, thus performing the steering of the wheel loader 1 at the traveling.

Here, a working mechanism 8 equipped with a loader bucket 8A is provided in the front vehicle body 3 of the wheel loader 1 to be capable of tilting/lifting thereto. On the other hand, a cab 9 that defines an operating room, an engine 10 as a prime mover, a power transmission device 15 for vehicles to be described later, and the like are provided in the rear vehicle body 5 of the wheel loader 1.

Further, a front axle (front wheel axis) 11 extending in the left-right direction is provided under the front vehicle body 3 and the left and right front wheels 2 are provided in both ends of the front axle 11. On the other hand, a rear axle (rear wheel axis) 12 extending in the left-right direction is provided under the rear vehicle body 5, and the left and right rear wheels 4 are provided in both ends of the rear axle 12. The front axle 11 is connected through a propeller shaft 13 to an output shaft 38 of the power transmission device 15 for vehicles to be described later. The rear axle 12 is connected through a propeller shaft 14 to the output shaft 38 of the power transmission device 15 for vehicles.

Next, an explanation will be made of the power transmission device for vehicles used in the first embodiment.

The power transmission device 15 for vehicles is mounted on the rear vehicle body 5 of the wheel loader 1. The power transmission device 15 for vehicles reduces rotational output of the engine 10 to be transmitted to the front axle 11 and the rear axle 12. Here, the power transmission device 15 for vehicles is configured of a casing 16, a transmission 23, a torque converter 41, and a lockup device 63, which will be described later.

Figure 6:
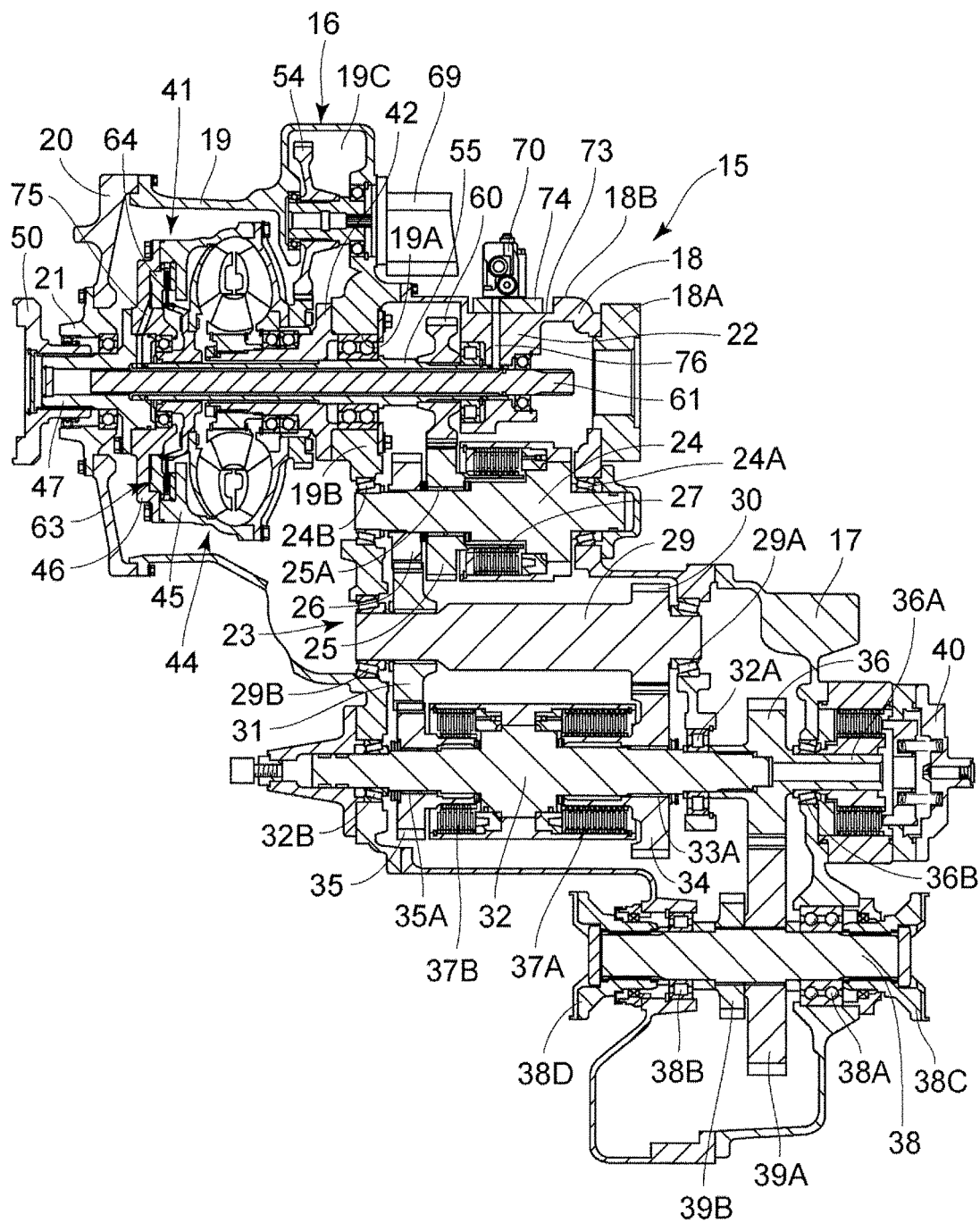
FIG. 6 is a longitudinal sectional view illustrating the power transmission device for vehicles as viewed in a direction of arrows VI-VI in FIG. 4.

The casing 16 configures an outer shell of the power transmission device 15 for vehicles. As illustrated in FIG. 6, the casing 16 is configured of a front casing 17 positioned in a front side of a front-rear direction, an intermediate casing 18 positioned in an intermediate side of the front-rear direction, a rear casing 19 positioned in a rear side of the front-rear direction (engine 10 side), and a lid member 20 that covers a rear end part of the rear casing 19. A stepped cylindrical boss member 21 is mounted in the central part of the lid member 20, and a through hole 21A is formed in an inner peripheral side of the boss member 21.

Figure 7:
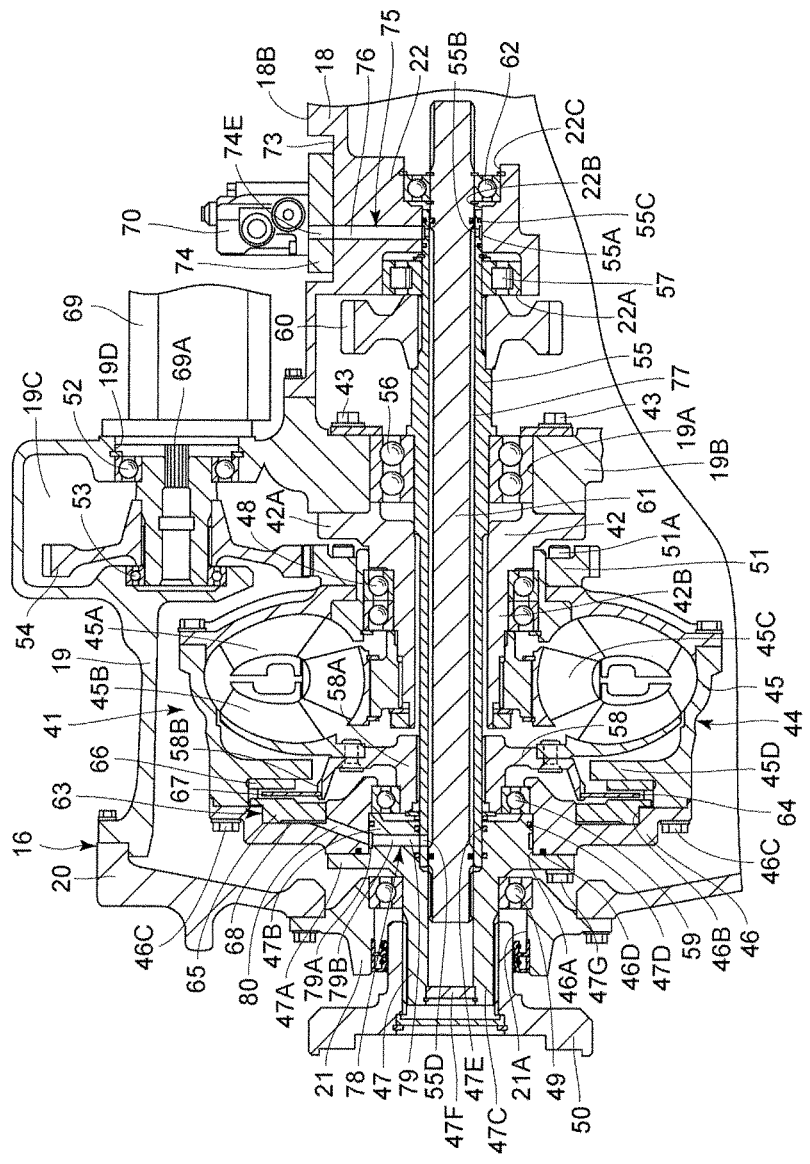
FIG. 7 is a cross section illustrating an essential part of a torque converter, a lockup device and the like in FIG. 6.
Figure 8:
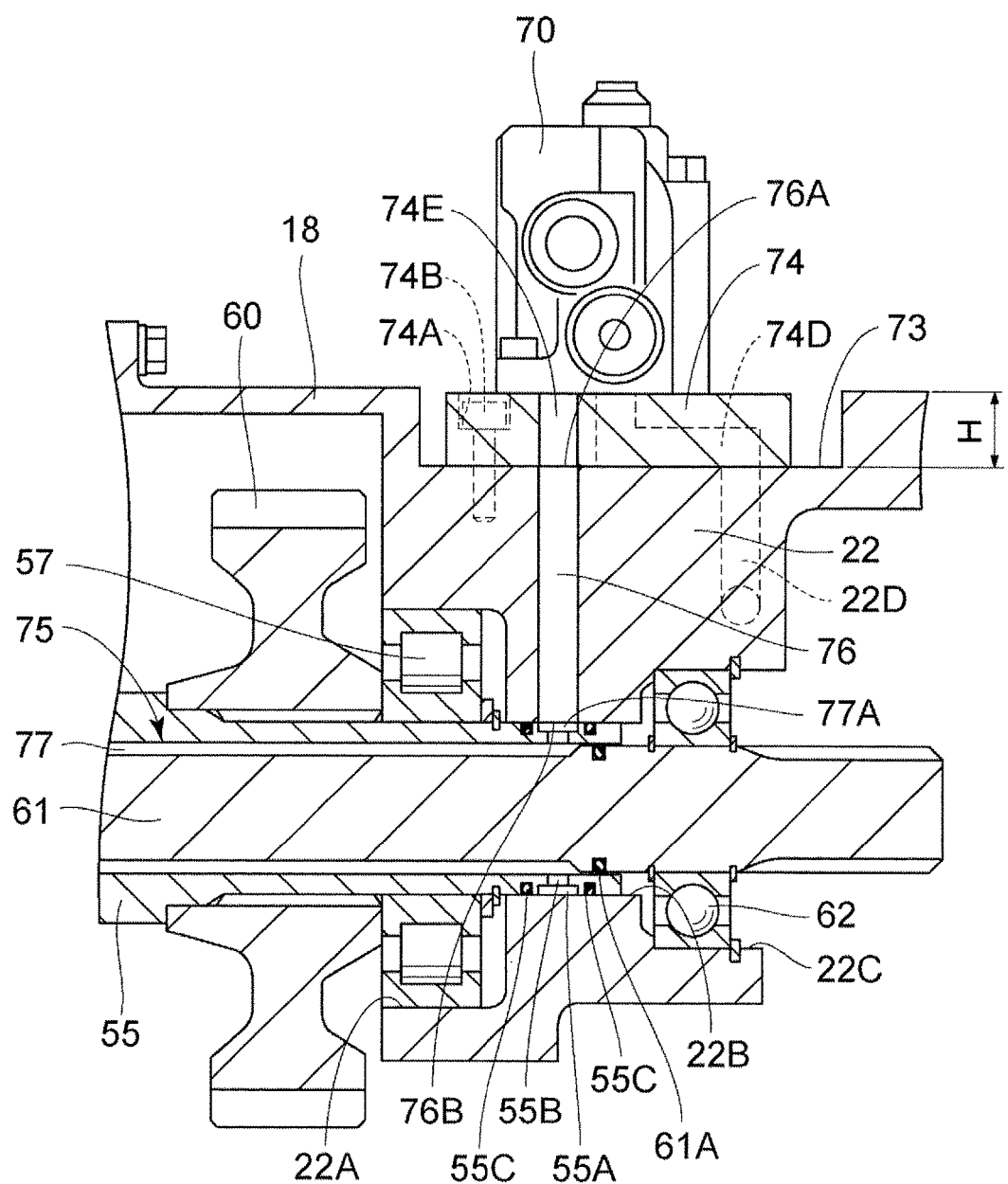
FIG. 8 is an enlarged cross section illustrating the lockup control valve, a mounting plate, a casing side oil passage and the like in FIG. 7 in an enlarging manner.

As illustrated in FIG. 6 to FIG. 8, a shaft support part 22 is provided on an inner peripheral surface in the top end side of the intermediate casing 18 to project downward therefrom. The shaft support part 22 is formed in a block shape, and supports a front end side of each of a transmission shaft 55 and a shaft member 61, which will be described later. The shaft support part 22 is provided therein with a large diameter bearing mounting hole 22A on which a bearing 57 to be described later is mounted, a small diameter shaft insertion hole 22B in which the transmission shaft 55 is inserted, and an intermediate diameter bearing mounting hole 22C on which a bearing 62 to be described later is mounted. Further, the shaft support part 22 is provided therein with a pump connecting oil passage 22D that is connected to a delivery side of a hydraulic pump 69 to be described later and into which pressurized oil from the hydraulic pump 69 flows, and a casing side oil passage 76 to be described later.

A shaft insertion hole 19A of the rear casing 19 is formed in a portion of a front face part 19B of the rear casing 19, the portion facing the shaft support part 22. The shaft insertion hole 19A is formed coaxially with the shaft insertion hole 22B of the shaft support part 22, and the transmission shaft 55 to be described later is inserted in the shaft insertion hole 19A. Further, on an upper side of the rear casing 19, a gear accommodating part 19C that accommodates a pump drive gear 54 to be described later is formed and a pump mounting hole 19D on which the hydraulic pump 69 to be described later is mounted is formed.

The transmission 23 is provided in the casing 16 together with the torque converter 41 to be described later. The transmission 23 changes rotational speeds of the engine 10 transmitted by the torque converter 41 to be output to the propeller shafts 13, 14. Here, the transmission 23 is configured of a forward shaft 24, a forward clutch mechanism 27, a backward shaft 28, a rotational shaft 29, first and second transmission shafts 32, 33, a first speed clutch mechanism 37A, a second speed clutch mechanism 37B and an output shaft 38.

The forward shaft 24 is arranged under the transmission shaft 55 to be described later, and is connected to the transmission shaft 55 at the time of travelling the wheel loader 1 forward. One end side of the forward shaft 24 in the axial direction is supported through a bearing 24A by the intermediate casing 18. The other end side of the forward shaft 24 in the axial direction is supported through a bearing 24B by the front face part 19B of the rear casing 19.

An input gear 25 is provided in an axial intermediate part of the forward shaft 24 to be regularly geared to a transmission gear 60 to be described later. Here, a needle bearing 25A is provided between the input gear 25 and the forward shaft 24 such that the input gear 25 is rotatable to the forward shaft 24. On the other hand, an output gear 26 is splined to the other end side of the forward shaft 24 in the axial direction such that the output gear 26 regularly rotates with the forward shaft 24.

The hydraulic type forward clutch mechanism 27 is provided between the forward shaft 24 and the input gear 25. For travelling the wheel loader 1 forward, engagement of the forward clutch mechanism 27 causes the forward shaft 24 and the input gear 25 to become in a connecting state to be united. Therefore, the rotation of the transmission gear 60 is transmitted through the input gear 25, the forward shaft 24 and the output gear 26 to the rotational shaft 29 to be described later. On the other hand, for travelling the wheel loader 1 backward, release (disengaged state) of the forward clutch mechanism 27 causes the forward shaft 24 and the input gear 25 to be disconnected and to cut out power transmission to the forward shaft 24.

Figure 4:
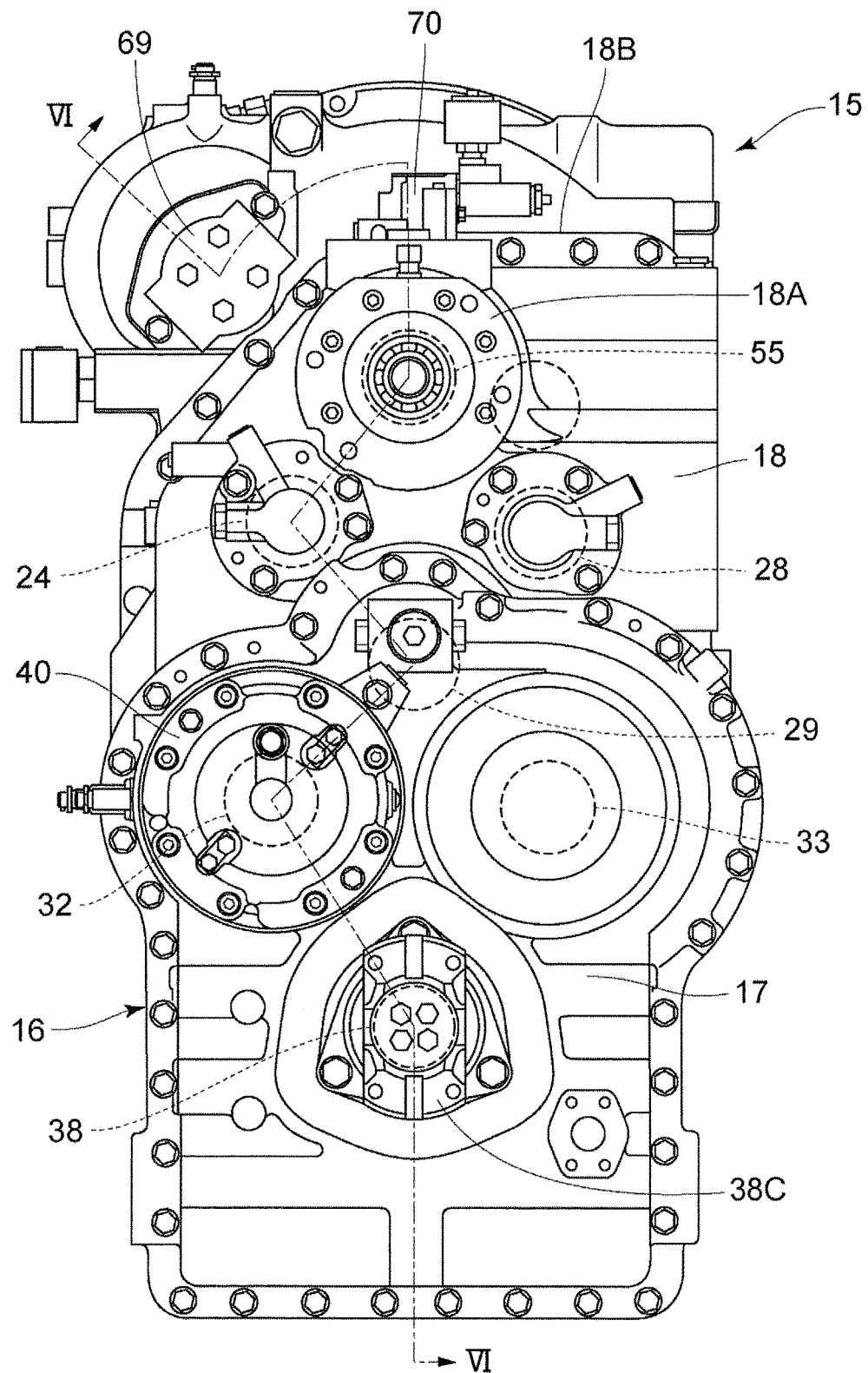
FIG. 4 is a side view illustrating the power transmission device for vehicles as viewed in a direction of arrows IV-IV in FIG. 2.
Figure 5:
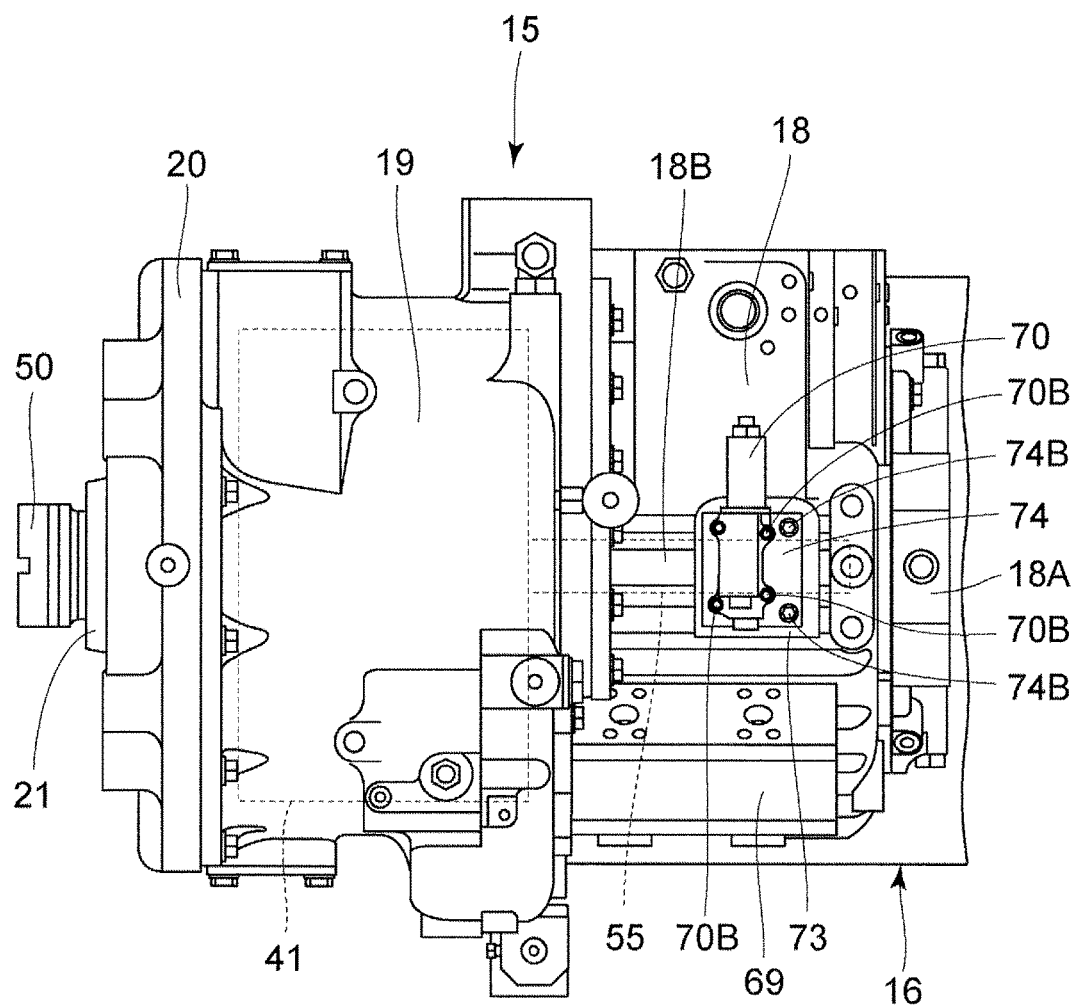
FIG. 5 is a plan view illustrating the power transmission device for vehicles as viewed in a direction of arrows V-V in FIG. 2.

Here, as illustrated in FIG. 4, the backward shaft 28 is arranged at the opposite to the forward shaft 24, sandwiching the transmission shaft 55. The backward shaft 28 is connected to the transmission shaft 55 at the time of travelling the wheel loader 1 backward. In the backward shaft 28 as well, an input gear, an output gear and a backward clutch mechanism (not shown none of them are shown) as similar to those in the forward shaft 24 are provided. Therefore, when the backward clutch mechanism is engaged in a state where the forward clutch mechanism 27 is disengaged, the rotation of the transmission gear 60 is transmitted through the backward shaft 28 and the like to the rotational shaft 29 to be described later by connecting the backward clutch mechanism.

The rotational shaft 29 is arranged under the forward shaft 24 and the backward shaft 28. One end side of the rotational shaft 29 in the axial direction is supported through a bearing 29A by the intermediate casing 18. The other end side of the rotational shaft 29 in the axial direction is supported through a bearing 29B by the front face part 19B of the rear casing 19. An output gear 30 is formed on one end side of the rotational shaft 29 in the axial direction to be integral therewith. Further, an input/output gear 31 having a diameter larger than that of the output gear 30 is splined to the other end side of the rotational shaft 29 in the axial direction.

The first transmission shaft 32 and the second transmission shaft 33 are arranged in parallel under the rotational shaft 29 (See FIG. 4). The first transmission shaft 32 changes the rotational speed of the rotational shaft 29 into either first speed rotation having a small rotating speed zone or second speed rotation having a rotating speed zone larger than that of the first speed rotation to be transmitted to the output shaft 38 to be described later. On the other hand, the second transmission shaft 33 changes the rotational speed of the rotational shaft 29 into either third speed rotation having a rotating speed zone larger than that of the aforementioned second speed rotation or fourth speed rotation having a rotating speed zone larger than that of the third speed rotation to be transmitted to the output shaft 38.

One end side of the first transmission shaft 32 in the axial direction is supported through a bearing 32A by the intermediate casing 18. The other end side of the first transmission shaft 32 in the axial direction is supported through a bearing 32B by the front face part 19B of the rear casing 19. One end part of the first transmission shaft 32 in the axial direction projects through the bearing 32A into the front casing 17. A first speed input gear 34 is provided in the one end side of the first transmission shaft 32 in the axial direction, and the first speed input gear 34 is regularly geared to the output gear 30 of the rotational shaft 29. A needle bearing 33A is provided between the first speed input gear 34 and the first transmission shaft 32 such that the first speed input gear 34 is rotatable to the first transmission shaft 32.

The second speed input gear 35 is provided in the other end side of the first transmission shaft 32 in the axial direction. The second speed input gear 35 is formed of a gear having a diameter smaller than that of the first speed input gear 34, and is regularly geared to the input/output gear 31 mounted to the rotational shaft 29. A needle bearing 35A is provided between the second speed input gear 35 and the first transmission shaft 32 such that the second speed input gear 35 is rotatable to the first transmission shaft 32.

An output gear 36 is splined to one end part of the first transmission shaft 32 in the axial direction. The output gear 36 is arranged in the front casing 17, and is regularly geared to a low speed side input gear 39A of the output shaft 38 to be described later. A cylindrical part 36A concentric with the first transmission shaft 32 is provided to project on the output gear 36, and the cylindrical part 36A is supported through the bearing 36B with the front casing 17.

The hydraulic type first speed clutch mechanism 37A is provided between the first transmission shaft 32 and the first speed input gear 34. The first speed clutch mechanism 37A is operated at the time of rotating the output shaft 38 with the first speed rotation. That is, when the first speed clutch mechanism 37A is engaged, the first transmission shaft 32 and the first speed input gear 34 become in a connecting state to be united. On the other hand, when the first speed clutch mechanism 37A is disengaged, the first transmission shaft 32 and the first speed input gear 34 are disconnected.

The hydraulic type second speed clutch mechanism 37B is provided between the first transmission shaft 32 and the second speed input gear 35. The second speed clutch mechanism 37B is operated at the time of rotating the output shaft 38 with the second speed rotation. That is, when the second speed clutch mechanism 37B is engaged, the first transmission shaft 32 and the second speed input gear 35 become in a connecting state to be united. On the other hand, when the second speed clutch mechanism 37B is disengaged, the first transmission shaft 32 and the second speed input gear 35 are disconnected.

Therefore, for travelling the wheel loader 1 with the first speed rotation, engaging the first speed clutch mechanism 37A causes the first transmission shaft 32 and the first speed input gear 34 to become in a connecting state. Thereby, the rotation of the rotational shaft 29 is transmitted through the output gear 30, the first speed input gear 34, the first transmission shaft 32 and the output gear 36 to the output shaft 38. On the other hand, for travelling the wheel loader 1 with the second speed rotation, engaging the second speed clutch mechanism 37B causes the first transmission shaft 32 and the second speed input gear 35 to become in a connecting state. Thereby, the rotation of the rotational shaft 29 is transmitted through the input/output gear 31, the second speed input gear 35, the first transmission shaft 32 and the output gear 36 to the output shaft 38.

On the other hand, a third speed input gear and a fourth speed input gear (not shown none of them are shown) respectively are rotatably provided on the second transmission shaft 33 as similar to the first transmission shaft 32. In addition, a third speed clutch mechanism (not shown) is provided between the second transmission shaft 33 and the third speed input gear, and a fourth speed clutch mechanism (not shown) is provided between the second transmission shaft 33 and the fourth speed input gear.

Therefore, for travelling the wheel loader 1 with the third speed rotation, the second transmission shaft 33 and the third speed input gear (not shown) are set to become in a connecting state. Thereby, the rotation of the rotational shaft 29 is transmitted through the output gear 30, the third speed input gear (not shown), the second transmission shaft 33 and an output gear (not shown) to the output shaft 38. On the other hand, for travelling the wheel loader 1 with the fourth speed rotation, the second transmission shaft 33 and the fourth speed input gear (not shown) are set to become in a connecting state. Thereby, the rotation of the rotational shaft 29 is transmitted through the input/output gear 31, the fourth speed input gear (not shown), the second transmission shaft 33 and an output gear (not shown) to the output shaft 38.

The output shaft 38 is arranged under the first transmission shaft 32 and the second transmission shaft 33. One end side of the output shaft 38 in the axial direction is supported through the bearing 38A by the front casing 17. The other end side of the output shaft 38 in the axial direction is supported through the bearing 38B by the intermediate casing 18. The one end side of the output shaft 38 projects through the bearing 38A into an outside of the front casing 17, and a front flange 38C is mounted on the projecting end part. The other end side of the output shaft 38 projects through the bearing 38B into an outside of the intermediate casing 18, and a rear flange 38D is mounted on the projecting end part.

The propeller shaft 13 is connected to the front flange 38C of the output shaft 38, and the propeller shaft 14 is connected to the rear flange 38D of the output shaft 38. As a result, rotational output of the output shaft 38 is transmitted through the propeller shaft 13 to the front axle 11 of the wheel loader 1, and through the propeller shaft 14 to the rear axle 12 of the wheel loader 1.

A low speed side input gear 39A and a high speed side input gear 39B are splined to the output shaft 38 in the axial intermediate part of the output shaft 38. The low speed side input gear 39A is regularly geared to the output gear 36 mounted on the first transmission shaft 32, and the high speed side input gear 39B is regularly geared to an output gear (not shown) mounted on the second transmission shaft 33.

Accordingly, when the rotation of the rotational shaft 29 is transmitted through the first speed clutch mechanism 37A or the second speed clutch mechanism 37B to the first transmission shaft 32, the rotation (first speed rotation or second speed rotation) of the first transmission shaft 32 is transmitted through the output gear 36 and the low speed side input gear 39A to the output shaft 38. On the other hand, when the rotation of the rotational shaft 29 is transmitted through the third speed clutch mechanism or the fourth speed clutch mechanism (none of them are shown) to the second transmission shaft 33, the rotation (third speed rotation or fourth speed rotation) of the second transmission shaft 33 is transmitted through the output gear (not shown) and the high speed side input gear 39B to the output shaft 38.

On the other hand, a cylindrical part 36A constituting the output gear 36 projects through the bearing 36B to an outside of the front casing 17. A brake device 40 is provided between a projecting end part of the cylindrical part 36A and the front casing 17, and the brake device 40 applies a braking force to the first transmission shaft 32 at the time of stopping the wheel loader 1.

Next, an explanation will be made of the torque converter provided in the casing 16 together with the transmission 23.

The torque converter 41 transmits the rotation of the engine 10 through fluid to the transmission 23. The torque converter 41, as illustrated in FIG. 7 and the like, includes a mounting base 42, the rotating body 44 and the transmission shaft 55, which will be described later.

The mounting base 42 is provided to mount the torque converter 41 in the casing 16. The mounting base 42 has a disk shaped collar part 42A, and a cylindrical part 42B that projects to a rear side (the lid member 20 side) from a center part of the collar part 42A. The collar part 42A of the mounting base 42 is mounted on the front face part 19B of the rear casing 19 using bolts 43 in a state of surrounding the shaft insertion hole 19A of the rear casing 19.

The rotating body 44 constitutes a major part of the torque converter 41, and is rotated by the engine 10. The rotating body 44 is formed in a hollow annular shape (donut shape) as a whole. The rotating body 44 is configured of a converter housing 45 a rear side (lid member 20 side) of which is formed as an opening end, a housing cover 46 that covers the opening end of the converter housing 45, and a supporting cylindrical body 47 that is mounted in a center part of the housing cover 46.

The converter housing 45 is provided therein with a pump impeller 45A composed of numerous blades, a turbine runner 45B, and a stator 45C, and is filled with fluid such as oil for power transmission. An annular flange plate 45D is provided on an inner peripheral surface of the converter housing 45 in the rear side, and the flange plate 45D faces the housing cover 46 to be spaced therefrom in the front-rear direction.

The housing cover 46 is formed in a disk shape as a whole, and a through hole 46A is formed on the center part thereof. An annular piston insertion groove 46B into which a piston 65 to be described later is inserted is formed on an inner side surface of the housing cover 46 positioned in the converter housing 45 side. The housing cover 46 is mounted on the converter housing 45 using bolts 46C. An annular seal ring (O-ring) 46D is provided on a rear end surface of the housing cover 46 to surround the through hole 46A, and the seal ring 46D establishes the seal between a collar part 47A of the supporting cylindrical body 47 to be described later and the housing cover 46. In addition, a second rotating body side oil passage 80 to be described later is formed in the housing cover 46.

The supporting cylindrical body 47 is configured of the disk shaped collar part 47A, a fitting cylindrical part 47B that projects forward (mounting base 42 side) from the collar part 47A, and a cylindrical part 47C that projects backward from the center part of the collar part 47A. An annular seal ring 47D is fitted on an outer peripheral surface of the fitting cylindrical part 47B in the front end side, and the seal ring 47D establishes the seal between the fitting cylindrical part 47B and the housing cover 46. An annular seal ring 47E is fitted on an inner peripheral surface of the fitting cylindrical part 47B in the front end side, and the seal ring 47E establishes the seal between the transmission shaft 55 to be described later and the inner peripheral surface of the fitting cylindrical part 47B. In addition, a first rotating body side oil passage 79 to be described later is formed on the fitting cylindrical part 47B.

On the other hand, a rear end side of the cylindrical part 47C is liquid-tightly sealed with a sealing plug 47F. The fitting cylindrical part 47B of the supporting cylindrical body 47 is fitted into the through hole 46A of the housing cover 46, and the collar part 47A of the supporting cylindrical body 47 is mounted on the housing cover 46 using bolts 47G.

The converter housing 45 is rotatably supported through a bearing 48 on the cylindrical part 42B of the mounting base 42. The cylindrical part 47C of the supporting cylindrical body 47 is rotatably supported through a bearing 49 on the boss member 21 of the casing 16. Accordingly, the rotating body 44 is rotatably supported through the bearings 48, 49 to the casing 16.

The cylindrical part 47C of the supporting cylindrical body 47 projects outside of the casing 16 through the through hole 21A of the boss member 21. A joint 50 is splined to a projecting end side of the cylindrical part 47C. The joint 50 is connected to, for example, a flywheel (not shown) of the engine 10, and the rotation of the engine 10 is transmitted through the joint 50 to the rotating body 44.

An output gear 51 for pump is fixed to a front side (collar part 42A side of the mounting base 42) of the converter housing 45 constituting the rotating body 44 using bolts 51A. On the other hand, a pump drive gear 54 is rotatably supported through bearings 52, 53 on the rear casing 19. In addition, the output gear 51 for pump is regularly geared to the pump drive gear 54.

The transmission shaft 55 of the torque converter 41 is formed as a hollow cylindrical body, and transmits the rotation of the rotating body 44 to the transmission 23. The transmission shaft 55 has an axial intermediate part that is inserted in an inner peripheral side of the cylindrical part 42B in the mounting base 42. An axial front end part of the transmission shaft 55 is inserted in the shaft insertion hole 22B of the shaft support part 22, and an axial rear end part of the transmission shaft 55 is inserted in the inner peripheral side of the fitting cylindrical part 47B of the supporting cylindrical body 47. The axial intermediate part of the transmission shaft 55 is rotatably supported through a bearing 56 mounted in the shaft insertion hole 19A of the rear casing 19 to the rear casing 19. The axial front end part side of the transmission shaft 55 is rotatably supported through a bearing 57 mounted in the bearing mounting hole 22A of the shaft support part 22 on the intermediate casing 18.

The front end side of the transmission shaft 55 projects through the bearing 57 into the shaft insertion hole 22B of the shaft support part 22. Here, as illustrated in FIG. 8, an annular groove 55A is formed on the outer peripheral surface of the transmission shaft 55 in the front end side over its entire circumference, and a plurality of communicating passages 55B are also formed in the front end side to cause the annular groove 55A to be communicated with the inner peripheral side of the transmission shaft 55. Two seal rings 55C are fitted in two locations of the outer peripheral surface of the transmission shaft 55 to interpose the annular groove 55A therebetween in the axial direction. On the other hand, a radial oil hole 55D is formed in the rear end side of the transmission shaft 55 to radially penetrate through the transmission shaft 55, and the radial oil hole 55D is communicated with a first rotating body side oil passage 79 to be described later that is formed in the supporting cylindrical body 47.

A disk shaped connecting flange 58 is provided in the axial rear end side of the transmission shaft 55. A cylindrical boss part 58A is provided in the center part of the connecting flange 58, and the boss part 58A is splined to the transmission shaft 55. The boss part 58A is rotatably supported through the bearing 59 mounted on the through hole 46A of the housing cover 46 on the rotating body 44. Therefore, the transmission shaft 55 is rotatably supported on the casing 16 in a state of being rotatable relative to the rotating body 44.

A radial intermediate part of the connecting flange 58 is fixed to the turbine runner 45B in the converter housing 45.

Therefore, the rotation of the turbine runner 45B is transmitted through the connecting flange 58 to the transmission shaft 55. In addition, a disk engaging part 58B to which a disk 67 in the lockup device 63 which will be described later is engaged is formed on an outer peripheral edge part of the connecting flange 58.

A transmission gear 60 is splined to the axial front end side of the transmission shaft 55. The transmission gear 60 is arranged adjacent to the shaft support part 22 to be regularly geared to the input gear 25 in the transmission 23.

A shaft member 61 is arranged in the inner peripheral side of the transmission shaft 55 to be coaxial with the transmission shaft 55. A front end side of the shaft member 61 is rotatably supported through the bearing 62 mounted in the bearing mounting hole 22C of the shaft support part 22 in the intermediate casing 18. A rear end part of the shaft member 61 is connected to an inner peripheral side of the supporting cylindrical body 47 constituting the rotating body 44 by spline connection. An axial intermediate part of the shaft member 61 is formed having a diameter smaller than that of each of both end sides in the axial direction. Therefore, an annular clearance is formed to axially extend between the transmission shaft 55 and the shaft member 61, and this clearance constitutes a transmission shaft side oil passage 77 to be described later.

A front end part of the shaft member 61 projects from the bearing 62 to be connected to an external device mounted to the intermediate casing 18. As illustrated in FIG. 8, an annular seal ring 61A is provided on an outer peripheral surface of the shaft member 61 in the front end side. The seal ring 61A establishes the seal between an inner peripheral surface of the transmission shaft 55 and the outer peripheral surface of the shaft member 61.

The rotating body 44 of the torque converter 41 is rotated by transmission of the rotation of the engine 10 through the joint 50 thereto. The converter housing 45 of the rotating body 44 rotates together with the pump impeller 45A, and the turbine runner 45B is rotated by flow of fluid generated in the converter housing 45 at this time. The rotation of the turbine runner 45B is transmitted through the connecting flange 58 to the transmission shaft 55. Thereby, the rotation of the transmission gear 60 splined to the transmission shaft 55 is transmitted to the input gear 25 in the transmission 23.

Next, an explanation will be made of the lockup device provided in the torque converter 41.

The lockup device 63 transmits the rotation of the engine 10 directly to the transmission 23, not through the fluid in the torque converter 41. Here, the lockup device 63 is configured of a lockup clutch 64, the hydraulic pump 69, a lockup control valve 70 and a lockup oil passage 75, which will be described later.

The lockup clutch 64 is provided between the connecting flange 58 splined to the transmission shaft 55 and the rotating body 44. The lockup clutch 64 is configured of a piston 65, a plate 66 and a disk 67. The piston 65 is formed by an annular plate member, and is inserted in the piston insertion groove 46B of the housing cover 46 to be capable of axially sliding therein. An annular oil chamber 68 is formed between the inner side surface of the housing cover 46 and the piston 65, and a second rotating body side oil passage 80 to be described later that is formed in the housing cover 46 opens to the oil chamber 68.

The plate 66 is formed by an annular plate member. The plate 66 is arranged in the inner peripheral side of the converter housing 45 in a state where a clearance is formed between the piston 65 and the plate 66. In this case, the plate 66 abuts on the flange plate 45D of the converter housing 45 to be restricted in axial movement.

The disk 67 is formed by an annular plate member having a thickness thinner than that of the plate 66. The disk 67 is mounted to the connecting flange 58 in a state of being interposed between the piston 65 and the plate 66. In this case, an inner peripheral edge part of the disk 67 is engaged to the disk engaging part 58B formed in an outer peripheral edge part of the connecting flange 58. This prohibits circumferential movement (rotation) of the disk 67 to the connecting flange 58, and allows axial movement thereof only thereto.

Accordingly, when pressurized oil is delivered into the oil chamber 68 from the hydraulic pump 69 to be describe later, the disk 67 is tightly held between the piston 65 and the plate 66 for the rotating body 44 and the transmission shaft 55 to be united through the disk 67 and the connecting flange 58. Therefore, the rotation of the rotating body 44 is directly transmitted to the transmission shaft 55.

The hydraulic pump 69 for lockup is mounted to the pump mounting hole 19D of the rear casing 19. A pump shaft 69A of the hydraulic pump 69 projects into the gear accommodating part 19C of the rear casing 19, and is splined to an inner peripheral side of the pump drive gear 54. Therefore, when the rotating body 44 rotates, the output gear 51 for pump mounted to the converter housing 45 rotates the pump drive gear 54 to drive the hydraulic pump 69. The hydraulic pump 69 delivers, for example, lubricating oil filled in the casing 16 through the lockup control valve 70 to be described later to the lockup clutch 64.

Figure 9:
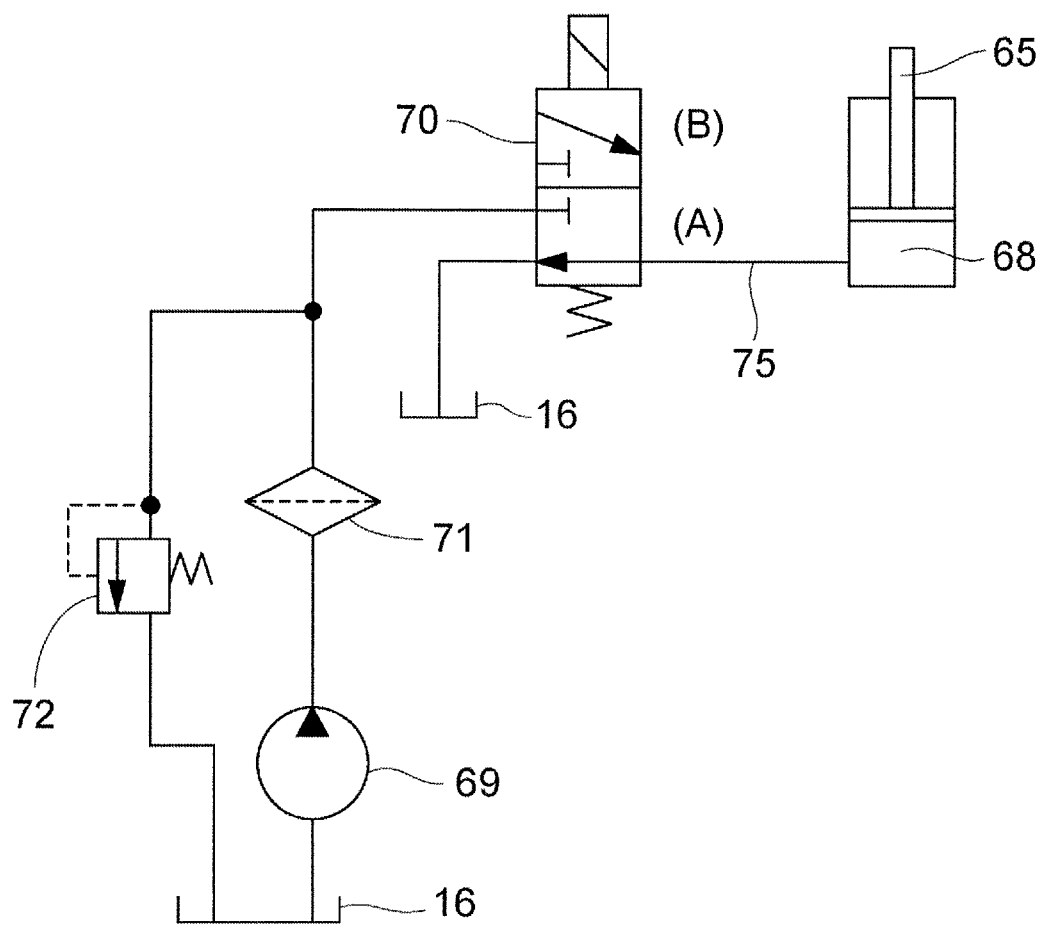
FIG. 9 is a hydraulic circuit view in the lockup device.

The lockup control valve 70 controls supply of the pressurized oil delivered from the hydraulic pump 69 to the lockup clutch 64. As illustrated in FIG. 9, the lockup control valve 70 is formed of an electromagnetic pilot type directional control valve having three ports and two positions. The lockup control valve 70 holds a valve position (A) when a traveling speed of the wheel loader 1 is less than a predetermined given speed and a signal is not supplied to an electromagnetic pilot part, for example. On the other hand, the lockup control valve 70 is switched to a valve position (B) when the traveling speed of the wheel loader 1 is equal to or more than the predetermined given speed and the signal is supplied to the electromagnetic pilot part. When the lockup control valve 70 is switched to the valve position (B), the pressurized oil from the hydraulic pump 69 is delivered to the oil chamber 68 in the lockup clutch 64. It should be noted that a filter 71 and an overload relief valve 72 are provided in the midway of an oil passage for connection between the hydraulic pump 69 and the lockup control valve 70.

Here, the lockup control valve 70 is arranged in a position of overlapping the transmission shaft 55 in the radial direction of the transmission shaft 55 on the outer side face 18B of the intermediate casing 18. Specifically, the lockup control valve 70 is arranged in a position upward of a shaft center of the transmission shaft 55 (right above the transmission shaft 55). A concave valve mounting surface 73 is formed on the outer side face 18B of the intermediate casing 18, and the lockup control valve 70 is fixed through a mounting plate 74 to be described later on the concave valve mounting surface 73.

The concave valve mounting surface 73 is provided in a position above the shaft center of the transmission shaft 55 on the outer side face 18B of the intermediate casing 18. The concave valve mounting surface 73 is formed as a flat surface having a square shape by recessing the outer side face 18B of the intermediate casing 18 toward the transmission shaft 55. Therefore, the concave valve mounting surface 73 is recessed by a height dimension H from the outer side face 18B of the intermediate casing 18 (see FIG. 8). As a result, a projecting amount of the lockup control valve 70 from the outer side face 18B of the intermediate casing 18 can be reduced by mounting the lockup control valve 70 on the concave valve mounting surface 73. In addition, the pump connecting oil passage 22D formed in the shaft support part 22 of the intermediate casing 18 and the casing side oil passage 76 to be described later are opened to the concave valve mounting surface 73.

Figure 3:
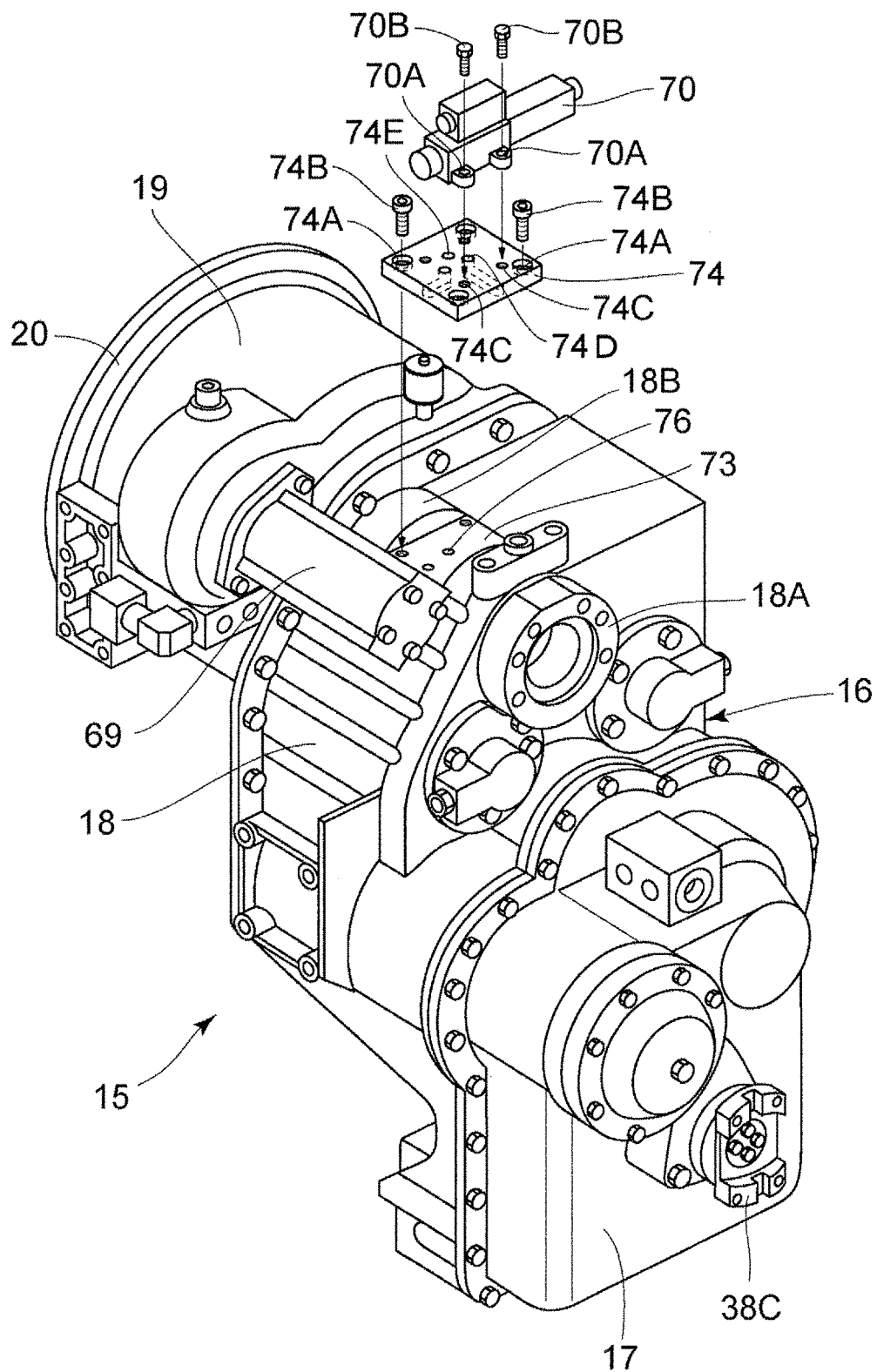

The mounting plate 74 is arranged between the concave valve mounting surface 73 and the lockup control valve 70. The mounting plate 74 is formed in a square flat plate having a size smaller than the concave valve mounting surface 73. The mounting plate 74 is provided with a plurality of bolt insertion holes 74A. A bolt 74B inserted in each of the bolt insertion holes 74A is threaded in the concave valve mounting surface 73 of the intermediate casing 18. As a result, the mounting plate 74 is fixed on the concave valve mounting surface 73 using the bolts 74B. In addition, as illustrated in FIG. 3, a plurality of bolt holes (female screw holes) 74C are formed in the mounting plate 74. Bolt 70B are inserted in bolt insertion parts 70A of the lockup control valve 70, and the bolt 70B is threaded in the bolt hole 74C to mount the lockup control valve 70 on the mounting plate 74 (See FIG. 3).

Further, an inlet side communicating passage 74D and an outlet side communicating passage 74E are provided in the mounting plate 74 (See FIG. 3 and FIG. 8). The inlet side communicating passage 74D makes communication between the pump connecting oil passage 22D provided in the shaft support part 22 of the intermediate casing 18 and an inlet port of the lockup control valve 70. In this case, the inlet side communicating passage 74D makes the communication between the pump connecting oil passage 22D and the inlet port of the lockup control valve 70 in a state of being bent in an L-letter shape for the pressurized oil from hydraulic pump 69 to be delivered thereto. On the other hand, the outlet side communicating passage 74E makes communication between an outlet port of the lockup control valve 70 and the casing side oil passage 76 to be described later. That is, the outlet side communicating passage 74E makes the communication between the outlet port of the lockup control valve 70 and the casing side oil passage 76 in a state of linearly extending in a plate thickness direction (upper-lower direction) of the mounting plate 74.

Next, an explanation will be made of the lockup oil passage that constitutes the lockup device 63 together with the lockup clutch 64 and the lockup control valve 70.

The lockup oil passage 75 introduces the pressurized oil delivered from the hydraulic pump 69 through the lockup control valve 70 to the lockup clutch 64. As illustrated in FIG. 7, the lockup oil passage 75 is configured of the casing side oil passage 76, a transmission shaft side oil passage 77 and a rotating body side oil passage 78.

The casing side oil passage 76 is formed in the shaft support part 22 of the intermediate casing 18, and establishes connection between the lockup control valve 70 and the transmission shaft side oil passage 77. As illustrated in FIG. 8, one end side 76A of the casing side oil passage 76 opens to the concave valve mounting surface 73, and is connected through the outlet side communicating passage 74E in the mounting plate 74 mounted on the concave valve mounting surface 73 to the outlet port of the lockup control valve 70. The other end side 76B of the casing side oil passage 76 opens to the shaft insertion hole 22B mounted in the shaft support part 22 in a position corresponding to the annular groove 55A of the transmission shaft 55.

Here, the casing side oil passage 76 is formed as a linear oil passage that linearly extends in the radial direction of the transmission shaft 55. That is, the casing side oil passage 76 extends in an upper-lower direction between an outlet port of the lockup control valve 70 and an inlet port 77A of the transmission shaft side oil passage 77 to be described later, and is formed as a single linear oil passage without a bending part in the midway. Therefore, pressure losses when the pressurized oil delivered from the hydraulic pump 69 flows in the casing side oil passage 76 can be reduced.

The transmission shaft side oil passage 77 is formed in the inner peripheral side of the transmission shaft 55 for connection between the casing side oil passage 76 and the rotating body side oil passage 78. Here, the transmission shaft side oil passage 77 is annually (cylindrically) formed between the outer peripheral surface of the shaft member 61 arranged in the inner peripheral side of the transmission shaft 55 and the inner peripheral surface of the transmission shaft 55, and extends in the axial direction of the transmission shaft 55. In this case, as illustrated in FIG. 8, the annular groove 55A of the transmission shaft 55 is communicated through the communicating passage 55B with the transmission shaft side oil passage 77. Accordingly, a position of the annular groove 55A constitutes the inlet port 77A of the transmission shaft side oil passage 77, and the pressurized oil having flowed down in the casing side oil passage 76 is introduced through the inlet port 77A into the transmission shaft side oil passage 77. In this case, the pressurized oil introduced into the transmission shaft side oil passage 77 is sealed in the inner peripheral side of the transmission shaft 55 by the seal ring 55C provided in the transmission shaft 55, the seal ring 61A provided in the shaft member 61, the seal ring 47E provided in the supporting cylindrical body 47, the sealing plug 47F and the like.

The rotating body side oil passage 78 is configured of a first rotating body side oil passage 79 formed in the supporting cylindrical body 47 and a second rotating body side oil passage 80 formed in the housing cover 46. The rotating body side oil passage 78 is provided for connection between the transmission shaft side oil passage 77 and the oil chamber 68 in the lockup clutch 64. Here, the first rotating body side oil passage 79 is configured of an annular groove 79A formed on an outer peripheral surface of the fitting cylindrical part 47B of the supporting cylindrical body 47 over the entire circumference and a single or a plurality of linear communicating passages 79B that communicate the annular groove 79A with the transmission shaft side oil passage 77.

The second rotating body side oil passage 80 is configured of a single or a plurality of oil passages that are provided in the housing cover 46. The second rotating body side oil passage 80 is provided for connection between the oil chamber 68 formed between the piston insertion groove 46B of the housing cover 46 and the piston 65, and the first rotating body side oil passage 79 (annular groove 79A).

The lockup oil passage 75 is configured of the aforementioned casing side oil passage 76, the transmission shaft side oil passage 77, and the rotating body side oil passage 78 composed of the first and second rotating body side oil passages 79, 80. Therefore, at the operation time of the lockup device 63, the pressurized oil delivered from hydraulic pump 69 is introduced into the oil chamber 68 in the lockup clutch 64 from the lockup control valve 70 through the casing side oil passage 76, the transmission shaft side oil passage 77, the radial oil hole 55D in the transmission shaft 55, the first rotating body side oil passage 79, and the second rotating body side oil passage 80. As a result, the disk 67 is tightly held between the piston 65 and the plate 66, and the rotating body 44 and the transmission shaft 55 are united through the disk 67 and the connecting flange 58, whereby the rotation of the rotating body 44 can be directly transmitted to the transmission shaft 55.

The power transmission device 15 for vehicles according to the first embodiment has the aforementioned configuration, and an explanation will hereinafter be made of an operation of the power transmission device 15 for vehicles.

When the engine 10 is operated for traveling the wheel loader 1, output of the engine 10 is transmitted through the joint 50 to the rotating body 44 of the torque converter 41 to rotate the converter housing 45. Therefore, flow of the fluid generated in the converter housing 45 causes the rotation of the turbine runner 45B, which is transmitted through the connecting flange 58 to the transmission shaft 55. On the other hand, when the rotating body 44 rotates, the pump drive gear 54 is rotated through the output gear 51 for pump mounted in the converter housing 45 to drive the hydraulic pump 69.

The rotation of the transmission gear 60 splined to the transmission shaft 55 is transmitted through the input gear 25, the forward shaft 24 and the like in the transmission 23 to the rotational shaft 29. Here, for example, in a case of traveling the wheel loader 1 with the first speed rotation, engaging the first speed clutch mechanism 37A causes the first transmission shaft 32 and the first speed input gear 34 to be in a connecting state. As a result, the rotation of the rotational shaft 29 is transmitted through the output gear 30 and the first speed input gear 34 to the first transmission shaft 32.

The rotation of the first transmission shaft 32 is transmitted to the low speed side input gear 39A of the output shaft 38 from the output gear 36, and the output shaft 38 rotates with the first speed rotation. The rotation of the output shaft 38 is transmitted through the propeller shaft 13 to the front axle 11, and is transmitted through the propeller shaft 14 to the rear axle 12. Therefore, the left and right front wheels 2 mounted in the front axle 11 and the left and right rear wheels 4 mounted in the rear axle 12 are rotated, and thereby it is possible to travel the wheel loader 1 with the first speed rotation.

Here, for example, when a traveling speed of the wheel loader 1 is equal to or more than a predetermined given speed, the lockup device 63 operates. That is, when the traveling speed of the wheel loader 1 is equal to or more than the predetermined given speed to provide a signal to the electromagnetic pilot part in the lockup control valve 70, the lockup control valve 70 is switched to a valve position (B).

The pressurized oil delivered from the hydraulic pump 69 is introduced through the pump connecting oil passage 22D provided in the shaft support part 22 in the intermediate casing 18 and the inlet side communicating passage 74D of the mounting plate 74 to the lockup control valve 70. In addition, the pressurized oil having flowed into the lockup control valve 70 is supplied from the lockup control valve 70 through the outlet side communicating passage 74E in the mounting plate 74 and the lockup oil passage 75 into the oil chamber 68 in the lockup device 63. That is, the pressurized oil from the lockup control valve 70 is supplied through the outlet side communicating passage 74E in the mounting plate 74, the casing side oil passage 76 formed in the intermediate casing 18 (shaft support part 22), the transmission shaft side oil passage 77 and the radial oil hole 55D that are formed in the transmission shaft 55, the first rotating body side oil passage 79 formed in the supporting cylindrical body 47 of the rotating body 44 and the second rotating body side oil passage 80 formed in the housing cover 46 of the rotating body 44 into the oil chamber 68 formed between the piston insertion groove 46B of the housing cover 46 and the piston 65.

Thereby, the disk 67 engaging to the connecting flange 58 (disk engaging part 58B) is tightly held between the piston 65 and the plate 66. Accordingly, the rotating body 44 and the transmission shaft 55 are united through the disk 67 and the connecting flange 58, and the rotation of the rotating body 44 is transmitted directly to the transmission shaft 55. As a result, at the operating time of the lockup device 63, the rotational output of the engine 10 can be transmitted directly to the transmission 23, not via the fluid in the torque converter 41.

In this case, according to the power transmission device 15 for vehicles by the first embodiment, the lockup control valve 70 constituting the lockup device 63 is arranged on the outer side face 18B of the intermediate casing 18 in the position of overlapping the transmission shaft 55 in the radial direction of the transmission shaft 55. Further, the casing side oil passage 76 constituting the lockup oil passage 75 is formed as the linear oil passage that linearly extends in the radial direction of the transmission shaft 55 between the lockup control valve 70 and the transmission shaft side oil passage 77. Therefore, it is possible to reduce the pressure loss while the pressurized oil delivered from the hydraulic pump 69 flows from the lockup control valve 70 through the casing side oil passage 76 to the transmission shaft side oil passage 77. As a result, the pressurized oil from the hydraulic pump 69 can smoothly flow through the lockup oil passage 75 into the oil chamber 68 in the lockup clutch 64. Therefore, the responsiveness of the lockup clutch 64 (clutch efficiency) can be enhanced to increase reliability of the lockup device 63.

In addition, the concave valve mounting surface 73 that is formed by recessing the outer side face 18B of the intermediate casing 18 toward the transmission shaft 55 is provided in the position above the shaft center of the transmission shaft 55 on the outer side face 18B of the intermediate casing 18. The lockup control valve 70 is mounted through the mounting plate 74 on the concave valve mounting surface 73. In this case, the concave valve mounting surface 73 is recessed by a height dimension H from the outer side face 18B of the intermediate casing 18. As a result, a projecting amount of the lockup control valve 70 from the outer side face 18B of the intermediate casing 18 can be reduced by mounting the lockup control valve 70 on the concave valve mounting surface 73. As a result, it is possible to miniaturize the entirety of the power transmission device 15 for vehicles, and even in a case where there is a limit to the equipment installation space of the rear vehicle body 5 in the wheel loader 1, the power transmission device 15 for vehicles can be arranged with allowance.

In addition, it is possible to shorten the casing side oil passage 76 by recessing the concave valve mounting surface 73 from the outer side face 18B of the intermediate casing 18 to furthermore reduce the pressure loss. Further, in a case where hydraulic pipes, hydraulic hoses and the like are distributed along the outer side face 18B of the intermediate casing 18, it is possible to restrict interference of the hydraulic pipes and the like with the lockup control valve 70 to enhance degrees of freedom in distribution thereof.

Figure 10:
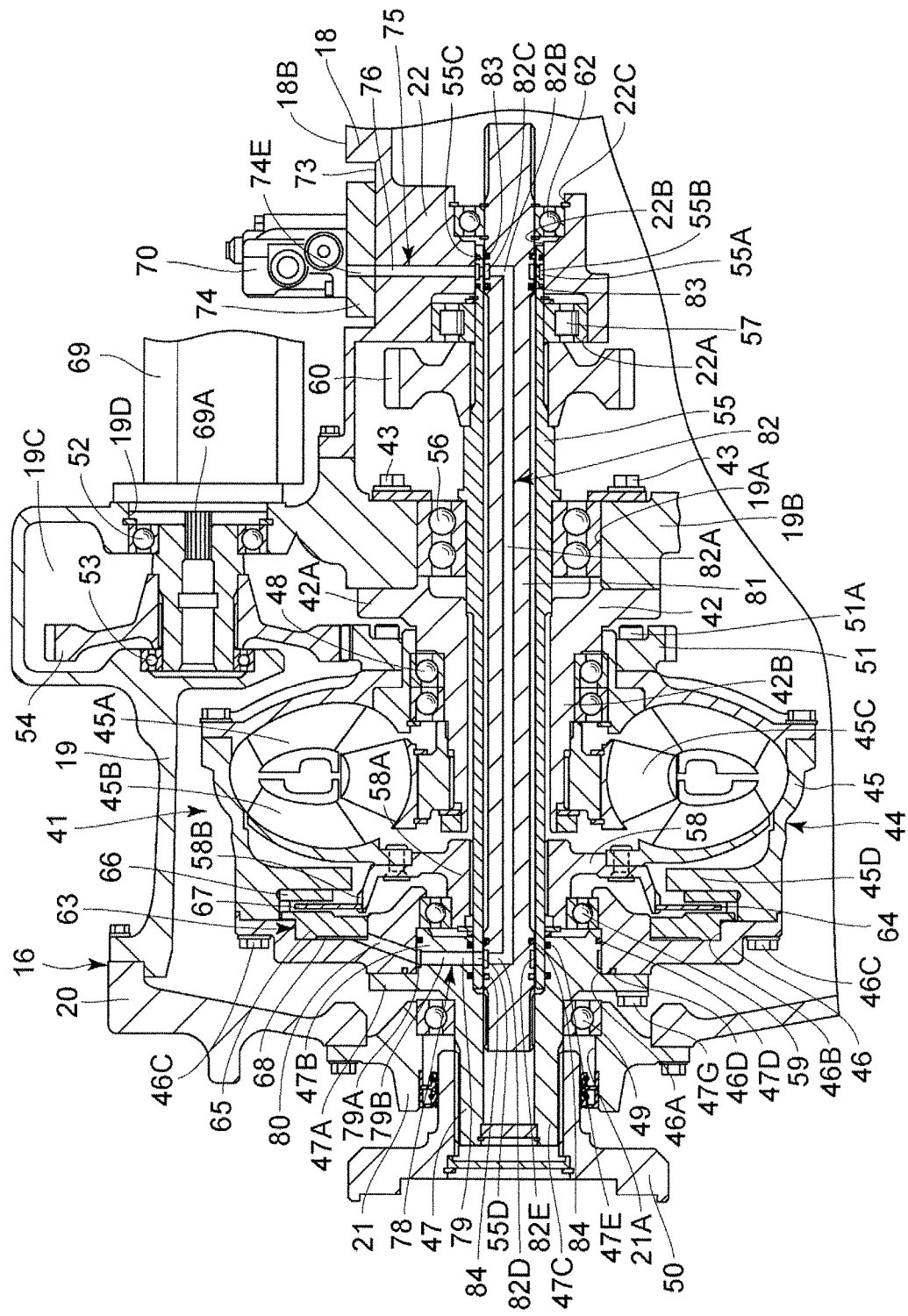
FIG. 10 is a cross section illustrating a power transmission device for vehicles according to a second embodiment of the present invention as similar to that in FIG. 7.

Next, FIG. 10 illustrates a power transmission device for vehicles according to a second embodiment of the present invention. The second embodiment is characterized in that a transmission shaft side oil passage is formed in a shaft member arranged in an inner peripheral side of a transmission shaft. It should be noted that in the second embodiment, the component elements that are identical to those of the foregoing first embodiment will be simply denoted by the same reference numerals to avoid repetitions of similar explanations.

A shaft member 81 that is applied to the second embodiment is formed of a bar-shaped member as similar to the shaft member 61 in the first embodiment, and is arranged in an inner peripheral side of the transmission shaft 55 to be coaxial with the transmission shaft 55. A front end side of the shaft member 81 is rotatably supported through the bearing 62 in the intermediate casing 18. On the other hand, a rear end part of the shaft member 81 is connected to an inner peripheral side of the supporting cylindrical body 47 by spline connection. The shaft member 81, however, differs from the shaft member 61 in the first embodiment in a point where a transmission shaft side oil passage 82 to be described later is formed in the center part.

The transmission shaft side oil passage 82 is formed through a shaft center of the shaft member 81. The transmission shaft side oil passage 82 is configured of an axial passage 82A that axially extends in the shaft member 81, a single or a plurality of front radial passages 82B that extend radially from a front end of the axial passage 82A, a front entire circumferential groove 82C that is formed on an outer peripheral surface of the shaft member 81 in the front end side over the entire circumference, a rear radial passage 82D that extends radially from a rear end of the axial passage 82A, and a rear entire circumferential groove 82E that is formed on an outer peripheral surface of the shaft member 81 in the rear end side over the entire circumference. The front entire circumferential groove 82C establishes communication between the front radial passages 82B and the casing side oil passage 76. The rear entire circumferential groove 82E establishes communication between the rear radial passage 82D and the first rotating body side oil passage 79 through the radial oil hole 55D in the transmission shaft 55.

Two seal rings 83 are fitted in two locations that axially interpose the front entire circumferential groove 82C therebetween on the outer peripheral surface of the shaft member 81. Each of the seal rings 83 makes a seal between the transmission shaft 55 and the shaft member 81. On the other hand, two seal rings 84 are fitted in two locations that axially interpose the rear entire circumferential groove 82E therebetween on the outer peripheral surface of the shaft member 81. Each of the seal rings 84 makes a seal between the transmission shaft 55 and the shaft member 81.

Thus, the transmission shaft side oil passage 82 is formed to axially extend in the shaft center of the shaft member 81. An inlet side of the transmission shaft side oil passage 82 is connected through the annular groove 55A and the communicating passage 55B in the transmission shaft 55 to the casing side oil passage 76, and an outlet side of the transmission shaft side oil passage 82 is connected through the radial oil hole 55D in the transmission shaft 55 to the rotating body side oil passage 78.

At the operation time of the lockup device 63, the pressurized oil delivered from the hydraulic pump 69 is introduced from the lockup control valve 70 through the casing side oil passage 76, the transmission shaft side oil passage 82, the radial oil hole 55D in the transmission shaft 55, and the oil passage into the oil chamber 68 in the lockup clutch 64. Thereby, the disk 67 is tightly held between the piston 65 and the plate 66, and the rotating body 44 and the transmission shaft 55 are united through the disk 67 and the connecting flange 58. Accordingly, the rotation of the rotating body 44 can be transmitted directly to the transmission shaft 55.

It should be noted that the embodiments exemplify the case where the power transmission device 15 for vehicles is mounted on the rear vehicle body 5 of the wheel loader 1. The present invention is, however, not limited thereto, and, for example, the power transmission device 15 for vehicles may be mounted on the front vehicle body 3 of the wheel loader 1.

Further, the embodiments exemplify the wheel loader 1 as a working vehicle on which the power transmission device 15 for vehicles is mounted. The present invention is, however, not limited thereto, and, for example, may be applied widely to other working vehicles such as a construction vehicle such as a wheel type excavator, a transport vehicle such as a lift truck, and an agriculture vehicle such as a tractor.

DESCRIPTION OF REFERENCE NUMERALS

1: Wheel loader (Vehicle)
10: Engine (Prime mover)
15: Power transmission device for vehicles
16: Casing
18: Intermediate casing
18B: Outer side face
23: Transmission
41: Torque converter
44: Rotating body
55: Transmission shaft
61, 81: Shaft member
63: Lockup device
64: Lockup clutch
69: Hydraulic pump
70: Lockup control valve
73: Concave valve mounting surface
74: Mounting plate
74E: Outlet side communicating passage (Communicating passage)
75: Lockup oil passage
76: Casing side oil passage
77, 82: Transmission shaft side oil passage
78: Rotating body side oil passage

The invention claimed is:

1. A power transmission device for vehicles comprising:
a casing that is mounted on a vehicle;
a transmission that is provided in said casing to change rotational speeds of an engine;
a torque converter that is mounted in said casing to transmit the rotation of said engine through fluid to said transmission; and
a lockup device that is mounted in said torque converter to transmit the rotation of said engine directly to said transmission,
wherein said torque converter includes a rotating body that is rotatably supported in said casing and is rotated by said engine, and a hollow cylindrical transmission shaft that is rotatably supported in said casing to transmit the rotation of said rotating body through fluid or said lockup device to said transmission, and
said lockup device includes a lockup clutch for establishing connection between said rotating body and said transmission shaft by pressurized oil delivered from a hydraulic pump, a lockup control valve that controls supply/discharge of the pressurized oil to/from said lockup clutch, and a lockup oil passage that introduces the pressurized oil from said lockup control valve to said lockup clutch, wherein
said lockup control valve is positioned on an outer side face of said casing and is arranged in a position of overlapping said transmission shaft in a radial direction of said transmission shaft;
said lockup oil passage includes a casing side oil passage that is provided in said casing to be connected to said lockup control valve, a transmission shaft side oil passage that is provided in said transmission shaft and an inlet side of which is connected to said casing side oil passage, and a rotating body side oil passage that is provided in said rotating body for establishing connection between an outlet side of said transmission shaft side oil passage and said lockup clutch;
said casing side oil passage is formed as a linear oil passage that linearly extends in the radial direction of said transmission shaft between said lockup control valve and said transmission shaft side oil passage;
a surface of said outer side surface in said casing, on which said lockup control valve is mounted, is formed as a concave valve mounting surface formed by recessing said outer side surface in said casing toward said transmission shaft;
said casing side oil passage is opened to said concave valve mounting surface;
a flat mounting plate is provided between said concave valve mounting surface and said lockup control valve; and
a communicating passage is provided in said mounting plate for communication between said lockup control valve and said casing side oil passage.

2. The power transmission device for vehicles according to claim 1, wherein
a shaft member connected to said rotating body is provided on an inner peripheral side of said transmission shaft, and
said transmission shaft side oil passage is formed between said transmission shaft and said shaft member, having an inlet side that is connected to said casing side oil passage and an outlet side that is connected to said rotating body side oil passage.

3. The power transmission device for vehicles according to claim 1, wherein
a shaft member connected to said rotating body is provided on an inner peripheral side of said transmission shaft, and
said transmission shaft side oil passage is formed to axially extend to be positioned in a shaft center of the said shaft member, having an inlet side that is connected to said casing side oil passage and an outlet side that is connected to said rotating body side oil passage.

* * * * *